(12) United States Patent
Noyes

(10) Patent No.: US 10,287,037 B2
(45) Date of Patent: May 14, 2019

(54) MEMBRANE MICROGRAVITY AIR CONDITONER

(71) Applicant: Oceaneering International, Inc., Houston, TX (US)

(72) Inventor: Gary Patrick Noyes, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 15 days.

(21) Appl. No.: 15/475,580

(22) Filed: Mar. 31, 2017

(65) Prior Publication Data

US 2017/0284751 A1    Oct. 5, 2017

Related U.S. Application Data

(60) Provisional application No. 62/315,951, filed on Mar. 31, 2016.

(51) Int. Cl.
| | |
|---|---|
| *B64G 1/48* | (2006.01) |
| *B64G 1/50* | (2006.01) |
| *B64G 1/60* | (2006.01) |
| *F24F 3/14* | (2006.01) |
| *F28F 13/18* | (2006.01) |
| *F28F 19/01* | (2006.01) |
| *F28F 9/00* | (2006.01) |

(52) U.S. Cl.
CPC .............. *B64G 1/50* (2013.01); *B64G 1/48* (2013.01); *B64G 1/60* (2013.01); *F24F 3/14* (2013.01); *F24F 2003/1435* (2013.01); *F28F 2255/20* (2013.01)

(58) Field of Classification Search
CPC ...... F28F 13/187; F28F 9/001; F28F 2255/20; F24F 3/14; F24F 2003/1435; B64G 1/48; B64G 1/50
See application file for complete search history.

(56) References Cited

U.S. PATENT DOCUMENTS

| | | | | | |
|---|---|---|---|---|---|
| 2,638,644 | A | * | 5/1953 | Rauhut ................... | F24F 6/043 261/142 |
| 4,090,370 | A | * | 5/1978 | Vaughan .................. | F24F 3/14 236/44 C |
| 4,156,351 | A | * | 5/1979 | Schlom ..................... | F24F 3/14 62/121 |
| 4,342,204 | A | * | 8/1982 | Melikian ................... | F24F 1/01 165/222 |
| 5,368,786 | A | * | 11/1994 | Dinauer ............... | B01D 53/268 128/203.12 |

(Continued)

*Primary Examiner* — Kun Kai Ma
(74) *Attorney, Agent, or Firm* — Maze IP Law, P.C.

(57) ABSTRACT

Clean condensate production may be produced from humidity in unfiltered air for an extended period of time using a membrane microgravity air conditioner which comprises an air box, comprising an inlet air flow path from a side face through an open top, and a filtering system disposed within the air box. The filtering system comprises one or more trash screens disposed in the inlet air flow path, one or more latent heat exchangers (LHX) disposed in the inlet air flow path, one or more particulate filters disposed in the inlet air flow path intermediate the trash screen and the LHX, one or more thermal control system (TCS) medium temperature loops, and one or more sensible heat exchangers (SHX) disposed in the inlet air flow path intermediate the particulate filter and the LHX.

18 Claims, 4 Drawing Sheets

(56) References Cited

U.S. PATENT DOCUMENTS

| | | | | |
|---|---|---|---|---|
| 5,555,732 | A * | 9/1996 | Whiticar | F24F 3/14 62/3.4 |
| 6,149,810 | A * | 11/2000 | Gonzalez-Martin | B01D 53/22 204/252 |
| 6,175,687 | B1 * | 1/2001 | Imamura | F24F 6/043 392/395 |
| 6,178,766 | B1 * | 1/2001 | Tong | F24F 1/0059 62/305 |
| 6,237,352 | B1 * | 5/2001 | Goodchild | B01D 5/0039 62/196.4 |
| 6,474,628 | B1 * | 11/2002 | Stroh | F24F 6/04 261/107 |
| 2009/0158928 | A1 * | 6/2009 | Wu | B01D 53/265 95/115 |
| 2011/0126564 | A1 * | 6/2011 | Anandhakrishnan | F24F 5/0035 62/121 |
| 2011/0174003 | A1 * | 7/2011 | Wenger | F28C 1/06 62/121 |
| 2012/0161340 | A1 * | 6/2012 | Sween | F28C 1/02 261/26 |
| 2015/0128807 | A1 * | 5/2015 | Peteln | B01D 45/10 96/226 |
| 2015/0204626 | A1 * | 7/2015 | Martell | F28F 27/00 165/200 |
| 2015/0253046 | A1 * | 9/2015 | Parker | F25B 39/04 62/304 |
| 2016/0040897 | A1 * | 2/2016 | Sakai | F24F 13/08 261/101 |
| 2016/0146483 | A1 * | 5/2016 | Sakai | F24F 6/04 62/176.4 |
| 2016/0281999 | A1 * | 9/2016 | Yagi | F24F 3/14 |
| 2017/0232385 | A1 * | 8/2017 | Kim | F24F 3/14 95/52 |
| 2017/0276383 | A1 * | 9/2017 | Gilbert | F28F 3/08 |

\* cited by examiner

MEMBRANE MICROGRAVITY AIR CONDITONER

RELATIONSHIP TO PRIOR APPLICATIONS

This application claims priority through U.S. Provisional Application 62/315,951 entitled "Membrane Microgravity Air Conditioner with UVC Biofilm Prevention" and filed on Mar. 31, 2016.

BACKGROUND OF THE INVENTION

Certain environments, e.g. space or other confined environments, may need a reliable method of producing clean condensate production from humidity in unfiltered air for an extended period of time, e.g. two months or longer, with low mass and volume for this water recovery from air humidity function. Further, the processed air should possess a sensible temperature and low detectable levels of O3 in condensate or the processed air. In addition, the apparatus should provide no more than a small amount of biofilm formation.

FIGURES

The figures supplied herein illustrate various embodiments of the invention.

DESCRIPTION OF VARIOUS EMBODIMENTS

Figure 1:
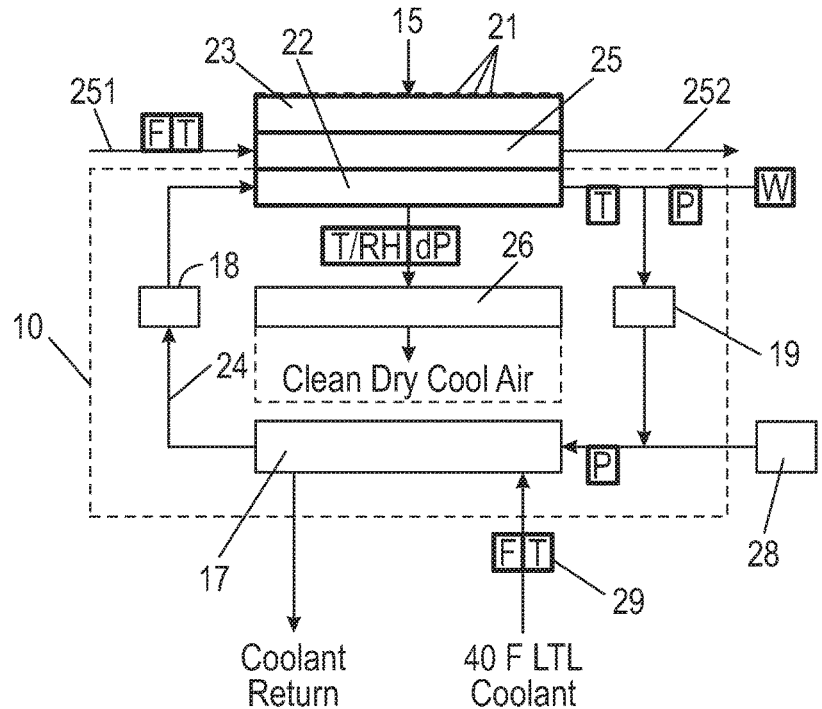
FIG. 1 is a block diagram of a first exemplary embodiment of a membrane microgravity air conditioner.

Referring now generally to FIG. 1, in a first embodiment, membrane microgravity air conditioner comprises air box 10; filtering system (generally referred to as "20" and not specifically called out in the figures) disposed at least partially, and preferably substantially completely, within air box 10; particulate filter 23 disposed in inlet air flow path 15 intermediate one or more trash screens 21 and one or more latent heat exchangers (LHX) 22; thermal control system (TCS) medium temperature loop 24, comprising a coolant; and sensible heat exchanger (SHX) 25 disposed in the inlet air flow path intermediate particulate filter 23 and latent heat exchangers (LHX) 22.

Figure 3:
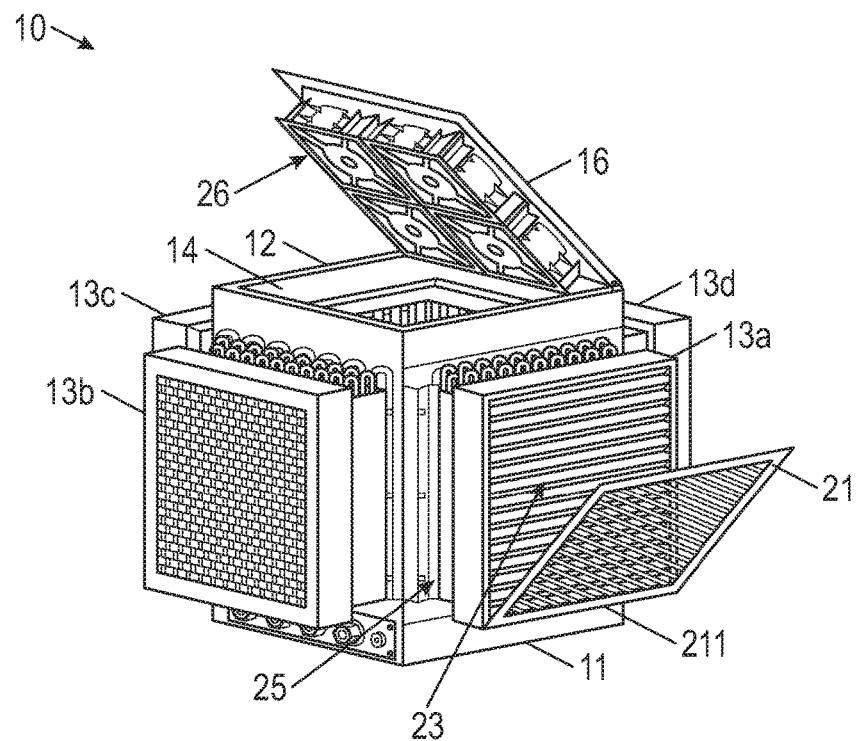
FIG. 3 is a view in partial perspective of an exemplary embodiment of a membrane microgravity air conditioner with an exemplary fan panel partially raised.

Referring additionally to FIG. 3, air box 10 may be substantially cubic and typically comprises closed bottom 11, an at least partially open top 12, and a plurality of side faces, e.g. side faces 13a-13d (FIG. 3), connected to closed bottom 11 and open top 12 to define interior 14, which, as noted, is typically substantially cubic. At least one side face 13a of the plurality of side faces 13a-13d and open top 12 define inlet air flow path 15 from that side face, e.g. 13a through open top 12. Although four side faces 13a-13d are illustrated, fewer or greater sides can be present.

Filtering system filtering system 20 typically comprises one or more substantially open filtering system braces 21 and one or more LHXs 22 disposed in inlet air flow path 15. In contemplated embodiments, filtering system brace 21 either secures, comprises, or both secures and comprises trash screen 21 which is disposed in inlet air flow path 15. There can be one or more filtering systems 20, most typically one filtering system 20 per each of the plurality of side faces 13a-13d.

In certain embodiments, filtering system 20 comprises hinge 211 disposed on an edge of filtering system 20, e.g. as part of filtering system brace 21, and attached to its associated side face 13a-13d to allow access to trash screen 21 and/or particulate filter 23 such as for periodic replacement from outside air box 10.

Figure 6:
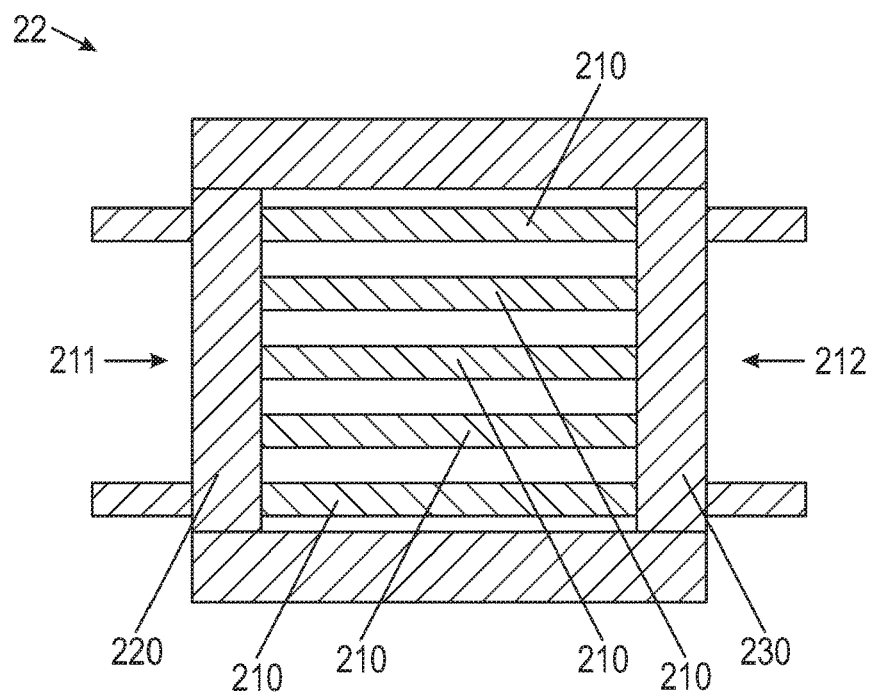
FIG. 6 is a block diagram of an exemplary latent heat exchanger (LHX)

Referring additionally to FIG. 6, each LHX 22 typically comprises one or more predetermined sets of nanoporous hydrophilic tubes 210, comprising a first end 211 and a second end 212; solid tube inlet manifold 220 in fluid communication with first end 211; and solid tube outlet manifold 230 in fluid communication with second end 212. Tubes 210 may act as inlet and outlet manifolds such as solid tube outlet manifold 230 may be present at first end 211 and a second end 212.

Figure 2:
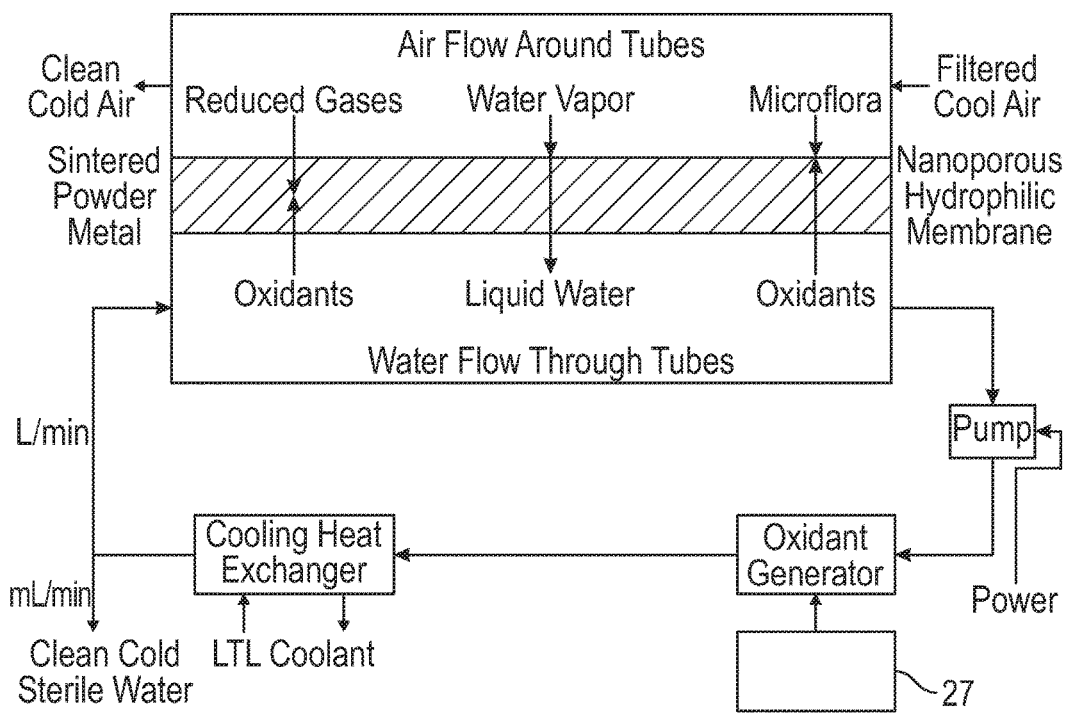
FIG. 2 is a block diagram of a second exemplary embodiment of a membrane microgravity air conditioner.

Referring back to FIG. 1, SHX 25 typically comprises fluid inlet 251 and fluid outlet 252 plumbed in parallel into TCS medium temperature loop 24; one or more air fans 26, which may be compact axial fans, disposed in inlet air flow path 15; and power source 27 (FIG. 2) operatively connected to equipment that needs power, e.g air fans 26 and/or pumps 19.

Figure 4:
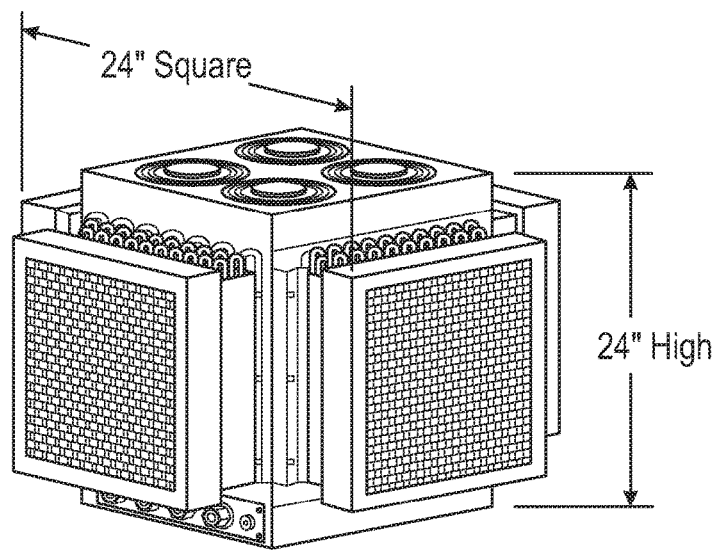
FIG. 4 is a view in partial perspective of an exemplary embodiment of a membrane microgravity air conditioner with an exemplary fan panel closed.
Figure 5:
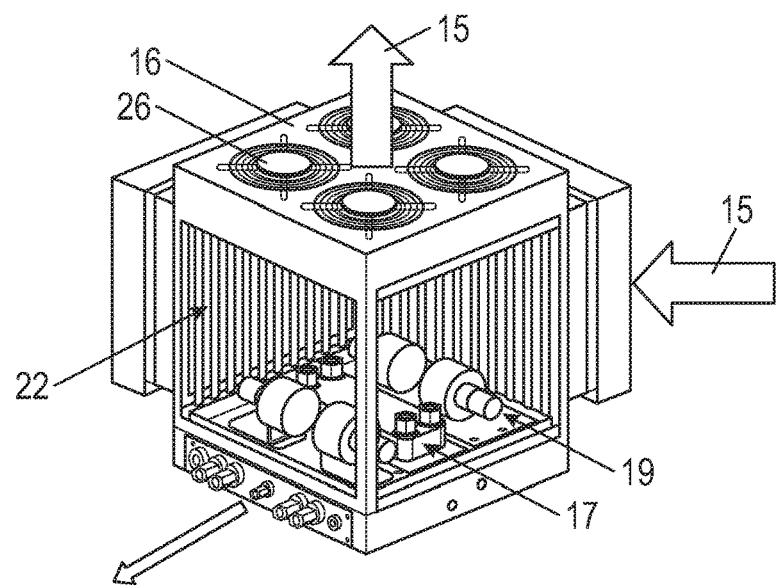
FIG. 5 is a view in partial cutaway perspective of an exemplary embodiment of a membrane microgravity air conditioner illustrating air flow.

As illustrated in FIGS. 3-5, in typical configurations air fan 26, which may be one or more such fans, e.g. four, is disposed intermediate LHX 22 and open top 12. In certain configures, fan panel 16 is disposed at least partially an interior of air box 10 or mounted to closed bottom or 11 open top 12 of air box 10. If present, one or more air fans 26 may also be attached or otherwise connected to fan panel 16. Also, if fan panel 16 is present, it may further comprise one or more hinges 161 disposed about an edge of fan panel 16 and configured to allow access to components inside air box 10 such as when fan panel 16 is moved about hinge 161.

The coolant is typically comprises a 55° F. liquid water-glycol mixture.

In contemplated embodiments, referring back to FIG. 1, water heat exchanger 17 may be disposed within air flow 16 and operatively in fluid communication with air fan 26. In such embodiments, one or more fluid meters 18 may be operatively disposed in air flow 15 intermediate water heat exchanger 17 and LHX 22. These fluid meters 18 may comprise a fluid flow meter, an orifice flow meter, or the like, or a combination thereof. Orifice flow meters, if present, are typically operative to monitor water flow rate and lower water pressure of water flowing through LHX 21 below that of air flowing through LHX 21. In these embodiments as well, one or more water sources 28 may be in fluid communication with water heat exchanger 17. Further, one or more water heat exchanger coolant sources 29 may be in fluid communication with water heat exchanger 17, where each such water heat exchanger coolant source 29 may further comprise a 40° F. coolant or the like. Further, one or more gear pumps 19, which may be pulse-free variable-speed gear pumps, may be disposed within air box 10 and operatively in fluid communication with water heat exchanger 17.

Figure 7:
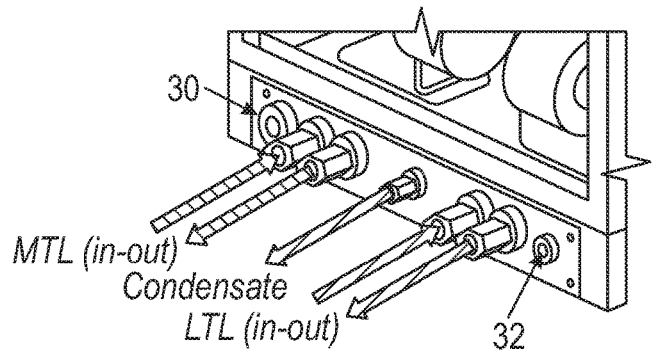
FIG. 7 is a view in partial cutaway perspective of a detail illustrating various fluid flows.
Figure 8:
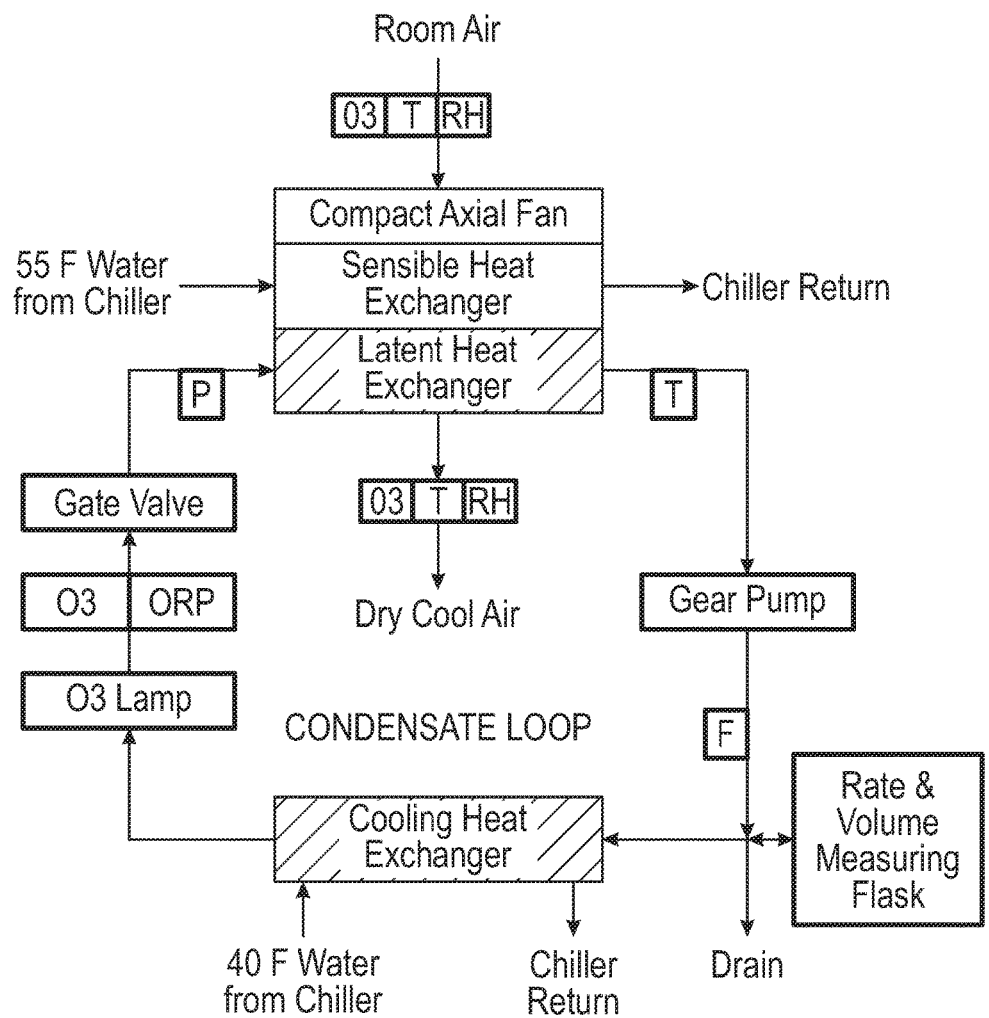
FIG. 8 is a block diagram of fluid flow processing.

Referring to FIG. 7, in embodiments, one or more power connectors 30 configured to provide an interface to a power source such as power source 27 (FIG. 2) and/or an external power source. Further, one or more communications data ports 32 may be present and operatively in communication a data communications network (not shown in the figures).

In the operation of exemplary embodiments, in general, as will be understood by those of ordinary skill in these arts, cold liquid water is retained in hydrophilic pores of tubes 210 by capillary action. Water vapor is allowed to condense from air flowing around the outside of tubes 210 into the retained cold water. Water vapor is allowed to flow through the tube walls into the cold water flowing through tubes 210, in response to a small pressure difference between the air outside tubes 210 and the water inside tubes 210.

Air is typically pulled out of open top 12 such as by one or more air fans 26, by way of example not limitation four identical air fans 26 in fan panel 16, with closed bottom 11 acting as a mounting panel. Hinged filtering systems 21 can allow access to trash screens 21 and/or particulate filters 23, such as for periodic replacement from outside air box 10.

As described above, one or more SHXs 25 are plumbed in parallel into TCS medium temperature loop 24, using its coolant to remove sensible heat load from the air. Atmosphere dew point temperature is controlled by one or more LHXs 22 to a predetermined temperature, e.g. 55° F. or less, so no water condenses in SHX 25. Humidity is removed from SHX-cooled air and condensed into a pumped circuit of cold water via LHX 22.

Latent heat generated in LHX 22 is transferred through WHX 17 to TCS low temperature loop 24 using its coolant to create low dew point temperature in the dehumidified air. WHX 17, and one or more gear pumps 19 for cold water circulation, may be mounted to the inside of air box 10, along with all plumbing connecting the cold water circuit components. Since all of these plumbed components run cold, condensate would form on their exterior surfaces if mounted outside of air box 10. Since air in the air box 10 is cool and dry, surface condensation is eliminated with minimal thermal insulation. Where present, gear pump 19, as described above, may have cool air flowing through air box 10 act as a convective heat sink for gear pump 19. Also, cool air flowing through the air box 10 acts as a convective heat sink for gear pump 19 motors, so motors with cooling fans are not required for microgravity compatibility.

If present, flow meter 18, which may comprise an orifice flow meter, is placed in the cold water circuit just upstream of LHX 22 not only monitors water flow rate, but also lowers the pressure of the water flowing through LHX 22 below that of air flowing through LHX 22.

In embodiments, generated oxidants ozone and hydrogen peroxide diffuse outward through NHM pores and reduced gases diffuse inward and are destroyed by the oxidants. Microflora in water on the NHM air surface are killed by the disinfecting power of the oxidants, preventing biofilm growth on the NHM. Oxidants can only be generated in the LHX water loop photochemically, by hard UVC light from mercury vapor, xenon flash, or xenon excimer lamps. Electrochemical generation of oxidants requires water containing dissolved salts; LHX water has negligible dissolved salts. All three of these UVC lamp types generate both biocidal UV at about 250 nm wavelength and oxidant UV below 200 nm wavelength. Xenon is a completely safe inert gas. Mercury vapor lamps are safely used for water disinfection and purification around the Earth, due to the fact that mercury exposure limits are higher than the vapor pressure of mercury at room temperature, and modern mercury vapor lamps have tough UV-transparent polymer coatings that contain mercury even if the lamp glass breaks.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A membrane microgravity air conditioner, comprising:
   a. an air box comprising:
      i. a closed bottom;
      ii. an at least partially open top; and
      iii. a plurality of sides, each side comprising a side face, connected to the closed bottom and the open top to define an interior, at least one side face of the plurality of side faces and the top defining an inlet air flow path from that face through the at least partially open top; and
   b. a filtering system disposed at least partially within the air box, the filtering system comprising:
      i. an open filtering system brace;
      ii. a trash screen disposed in the inlet air flow path;
      iii. a latent heat exchanger (LHX) disposed in the inlet air flow path, the LHX comprising:
         1. a predetermined set of nanoporous hydrophilic tubes, comprising a first end and a second end;
         2. a solid tube inlet manifold in fluid communication with the first end; and
         3. a solid tube outlet manifold in fluid communication with the second end;
      iv. a particulate filter disposed in the inlet air flow path intermediate the trash screen and the LHX;
      v. a thermal control system (TCS) medium temperature loop comprising a coolant;
      vi. a sensible heat exchanger (SHX) disposed in the inlet air flow path intermediate the particulate filter and the LSX, the SHX comprising a fluid inlet and a fluid outlet plumbed in parallel into the TCS medium temperature loop;
      vii. an air fan disposed in the inlet air flow path; and
   c. a power source operatively connected to the air fan.

2. The membrane microgravity air conditioner of claim 1, wherein the plurality of sides comprises four sides.

3. The membrane microgravity air conditioner of claim 1, wherein the interior is substantially cuboid.

4. The membrane microgravity air conditioner of claim 1, wherein the filtering system comprises one filtering system per each of the plurality of side faces.

5. The membrane microgravity air conditioner of claim 1, wherein the filtering system comprises a hinge disposed on an edge of the filtering system, the hinge configured to allow access to the particulate filter for periodic replacement from outside of the air box.

6. The membrane microgravity air conditioner of claim 1, wherein the air fan is disposed intermediate the LHX and the open top.

7. The membrane microgravity air conditioner of claim 1, further comprising a fan panel disposed in the interior of the air box, the air fan connected to the fan panel.

8. The membrane microgravity air conditioner of claim 7, wherein the fan panel is mounted to the closed bottom.

9. The membrane microgravity air conditioner of claim 7, wherein the fan panel comprises a hinge disposed about an edge of the fan panel and configured to allow access to components inside the air box.

10. The membrane microgravity air conditioner of claim 1, further comprising a water heat exchanger disposed within the air flow and operatively in fluid communication with the air fan.

11. The membrane microgravity air conditioner of claim 10, further comprising a fluid meter operatively disposed in the air flow intermediate the water heat exchanger and the LHX.

12. The membrane microgravity air conditioner of claim 11, wherein the fluid meter comprises a fluid flow meter disposed upstream of the LHX or an orifice flow meter disposed upstream of the LHX and operative to monitor water flow rate and operative to lower water pressure of water flowing through the LHX to a pressure below the pressure of air flowing through the LHX.

13. The membrane microgravity air conditioner of claim 10, further comprising:
  a. a water source in fluid communication with the water heat exchanger; and
  b. a water heat exchanger coolant source in fluid communication with the water heat exchanger.

14. The membrane microgravity air conditioner of claim 10, further comprising a gear pump disposed within the air box and operatively in fluid communication with the water heat exchanger.

15. The membrane microgravity air conditioner of claim 1, wherein the power source comprises a power connector configured to provide an interface to an external power source.

16. The membrane microgravity air conditioner of claim 1, further comprising a communications data port operatively in communication with a data communications network.

17. A method of providing clean condensate production from humidity in unfiltered air for an extended period of time using a membrane microgravity air conditioner, the membrane microgravity air conditioner comprising an air box comprising a closed bottom, an at least partially open top, and a plurality of faces connected to the closed bottom and the open top to define an interior, a face of the plurality of faces and the at least partially open top defining an inlet air flow path from that face through the open top, and a filtering system disposed within the air box, the filtering system comprising a trash screen disposed in the inlet air flow path, a latent heat exchanger (LHX) disposed in the inlet air flow path, a particulate filter disposed in the inlet air flow path intermediate the trash screen and the LHX, a Thermal Control System (TCS) Medium Temperature Loop comprising a coolant, a sensible heat exchanger (SHX) disposed in the inlet air flow path intermediate the particulate filter and the LSH, the SHX plumbed in parallel into the Thermal Control System (TCS) Medium Temperature Loop, a fan disposed in the inlet air flow path, and a power source operatively connected to the fan, the method comprising:
  a. retaining cold liquid water in hydrophilic pores of the tubes by capillary action;
  b. allowing water vapor to condense from air flowing around the outside of the tubes into the retained cold liquid water; and
  c. allowing the water vapor to flow through the tube walls into the cold liquid water flowing through the tubes, in response to the small pressure difference between the air outside the tubes and the water inside the tubes.

18. The method of claim 17, wherein the membrane microgravity air conditioner further comprises a gear pump disposed within the air box and operatively in fluid communication with the water heat exchanger, the method further comprising allowing cool air flowing through the air box to act as a convective heat sink for the gear pump.

* * * * *